(12) United States Patent
Watsuji

(10) Patent No.: US 7,380,700 B2
(45) Date of Patent: Jun. 3, 2008

(54) PASTE COMPOSITION FOR BRAZING AND BRAZING METHOD USING THE SAME

(75) Inventor: Takashi Watsuji, Yokaichi (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 0 days.

(21) Appl. No.: 10/504,270

(22) PCT Filed: Mar. 12, 2003

(86) PCT No.: PCT/JP03/02954

§ 371 (c)(1),
(2), (4) Date: Aug. 11, 2004

(87) PCT Pub. No.: WO03/080286

PCT Pub. Date: Oct. 2, 2003

(65) Prior Publication Data

US 2005/0116208 A1   Jun. 2, 2005

(30) Foreign Application Priority Data

Mar. 22, 2002 (JP) ............................. 2002-081205

(51) Int. Cl.
*B23K 31/02* (2006.01)
*B23K 35/34* (2006.01)
(52) U.S. Cl. .................... 228/248.1; 148/24
(58) Field of Classification Search ............ 228/248.1; 472/126.1; 148/22, 24
See application file for complete search history.

(56) References Cited

U.S. PATENT DOCUMENTS

| | | | | |
|---|---|---|---|---|
| 4,301,211 A | * | 11/1981 | Sloboda | ...................... 428/385 |
| 4,703,091 A | * | 10/1987 | Gardner et al. | .......... 525/332.3 |
| 5,830,389 A | * | 11/1998 | Capote et al. | ............... 252/512 |
| 5,922,397 A | * | 7/1999 | Brandt et al. | ............... 427/97.5 |
| 6,089,445 A | * | 7/2000 | Sindzingre et al. | ......... 228/218 |
| 6,497,770 B2 | * | 12/2002 | Watsuji et al. | ................. 148/23 |
| 2004/0007312 A1 | * | 1/2004 | Yamauchi | ................... 156/150 |
| 2004/0112478 A1 | * | 6/2004 | Bieler et al. | ................. 148/538 |

FOREIGN PATENT DOCUMENTS

| | | |
|---|---|---|
| EP | 0 276 381 A2 | 8/1998 |
| EP | 0 980 738 A2 | 2/2000 |
| EP | 980738 A2 * | 2/2000 |
| JP | 8-229695 A | 9/1996 |

* cited by examiner

*Primary Examiner*—Kiley Stoner
(74) *Attorney, Agent, or Firm*—Birch, Stewart, Kolasch & Birch, LLP

(57) ABSTRACT

The invention provides a paste composition for brazing, which upon brazing, does not cause brazing insufficiency such as residual carbon in any type of industrial brazing furnace, can achieve an excellent outward appearance of a brazed portion after brazing and can be applied to any existing industrial brazing furnaces, as well as a brazing method using the same. The paste composition for brazing comprises a brazing powder, butyl rubber and an organic solvent, wherein the brazing powder comprises at least one member selected from the group consisting of copper brazing powder, brass brazing powder, silver brazing powder, phosphorus copper brazing powder, nickel brazing powder, gold brazing powder, palladium brazing powder, copper-manganese brazing powder, silver-manganese brazing powder and cobalt brazing powder. The paste composition for brazing is applied onto at least a part of a surface of one base material and then the one base material is brazed onto the other base material.

9 Claims, No Drawings

PASTE COMPOSITION FOR BRAZING AND BRAZING METHOD USING THE SAME

TECHNICAL FIELD

The present invention relates to a paste composition for brazing and a brazing method using the same, and in particular, to a paste composition for brazing containing a brazing powder upon joining a metal, ceramics or graphite and a brazing method using the same.

BACKGROUND ART

A brazing method is one kind of joining method for metal, ceramics etc., which falls into the category of welding method. In particular, the brazing method is a method of brazing using a brazing material having a melting point of not less than 450° C. and lower than the melting point of a base material to be brazed. Specifically, brazing is conducted in the following manner. A brazing material applied onto the surface of one base material is heated to a temperature at which the brazing material is melted but the base material is not melted, whereby the melted brazing material is attracted by the capillary phenomenon toward a joining surface of the other base material, to form a thin film of the brazing material. Thereafter, the brazing material is solidified by cooling to join the one base material to the other material.

Metal used generally as a brazing material in brazing is used in the form of a plate, foil, wire, powder, or powder-containing paste.

The brazing material in the paste form among these forms is used frequently because it is suitable for application to a site onto which the brazing material in the form of a plate, foil, wire or powder is hard to apply, that is, a site where the brazing material easily drops before or during brazing. The paste composition is composed essentially of a brazing powder, a binder and an organic solvent. As a binder solution, brazing cement or the like is commercially available. When the binder solution is used, it can be mixed with a commercial powdery brazing material to give a paste composition.

Brazing is carried out by using an industrial brazing furnace such as a reducing gas atmosphere furnace, an inert gas atmosphere furnace or a vacuum furnace. When a conventional paste composition is used in brazing, a carbon component remains on a brazed portion after brazing, depending on the type of brazing furnace, which may generate residual carbon etc. to cause brazing insufficiency. For example, a certain paste composition does not cause brazing insufficiency upon brazing in a furnace of a reducing gas atmosphere such as a hydrogen-containing gas, but causes significant brazing insufficiency such as residual carbon sometimes upon brazing in a furnace of an inert gas atmosphere such as argon gas, helium gas etc. or in a vacuum furnace. Accordingly, even if a paste composition suitable for a base material as a subject to be brazed is selected as a brazing material, the type of brazing furnace used is sometimes limited in order to prevent brazing insufficiency and to achieve an excellent outward appearance of a brazed portion. This is extremely inconvenient in industrial production.

At present, a paste composition for brazing which can, regardless of the type of industrial furnace, be applied to any type of brazing furnace has never been obtained.

Accordingly, an object of the present invention is to provide a paste composition for brazing, which upon brazing, does not cause brazing insufficiency such as residual carbon in any type of industrial brazing furnace, can achieve an excellent outward appearance of a brazed portion after brazing and can be applied to any existing industrial brazing furnaces, as well as a brazing method using the same.

DISCLOSURE OF INVENTION

The present inventor made extensive study on factors causing brazing insufficiency such as residual carbon etc., and as a result he found that brazing insufficiency is caused by a binder contained in the paste composition. Based on this inventor's finding, the present invention was made, and has the following characteristic constitution.

The paste composition for brazing according to one aspect of this invention comprises a brazing powder, butyl rubber and an organic solvent, wherein the brazing powder includes at least one member selected from the group consisting of copper brazing powder, brass brazing powder, silver brazing powder, phosphorus copper brazing powder, nickel brazing powder, gold brazing powder, palladium brazing powder, copper-manganese brazing powder, silver-manganese brazing powder and cobalt brazing powder.

As used herein, the butyl rubber refers to an isobutylene monomer/isoprene monomer copolymer.

The paste composition for brazing of the present invention comprises butyl rubber as a binder. The linkage between the isobutylene monomer and isoprene monomer in the butyl rubber is a linear chain and thus its structure is easily decomposed by heating. It follows that without being influenced by an atmosphere in a brazing furnace, the butyl rubber is easily decomposed by heating in a brazing process. When the present paste composition containing butyl rubber as the binder is used in brazing, the binder is easily decomposed by heating in the brazing process, and can thus attain an excellent outward appearance of a brazed portion after brazing, without causing brazing insufficiency such as residual carbon.

Preferably, the paste composition for brazing of the present invention comprises the brazing powder in an amount of at least 50 mass % and not more than 95 mass % and the butyl rubber in an amount of at least 0.5 mass % and not more than 10 mass %, respectively, based on 100 mass % of the paste composition. Preferably, the average particle diameter of the brazing powder is at least 1 μm and not more than 175 μm.

The brazing method according to another aspect of the present invention comprises the steps of applying a paste composition for brazing having the above features onto at least a part of a surface of one base material and then brazing the one base material onto the other base material.

Preferably, the brazing method of the present invention is carried out in a vacuum furnace or in a gas atmosphere furnace. When brazing is carried out in a gas atmosphere furnace, an argon gas and/or a helium gas or a hydrogen-containing gas and/or an ammonia-containing gas is used more preferably as the atmospheric gas.

As described above, the butyl rubber contained in the paste composition of the present invention is decomposed at an increasing temperature during brazing without being influenced by an atmosphere in a brazing furnace. Accordingly, when the present paste composition comprising butyl rubber as the binder is used in brazing, the binder is heated during the brazing process to be easily decomposed so that after brazing, an excellent outward appearance of a brazed portion can be attained without generating brazing insufficiency such as darkening.

The viscosity of the paste composition of the present invention can be regulated suitably by incorporation of a solvent etc., and thus known coating methods can be used.

Further, the brazing method of the present invention can be practiced in any existing brazing furnaces.

The paste composition of the present invention is excellent in brazing properties regardless of whether it is dried or not after application.

BEST MODE FOR CARRYING OUT THE INVENTION

Hereinafter, embodiments of the present invention are described.

The brazing powder contained in the paste composition of the present invention is a metallic brazing powder used generally at present, which is copper brazing powder, brass brazing powder, silver brazing powder, phosphorus copper brazing powder, nickel brazing powder, gold brazing powder, palladium brazing powder, copper-manganese brazing powder, silver-manganese brazing powder, cobalt brazing powder or the like. As the brazing powder, one kind of metallic brazing powder described above is used, but plural kinds of metallic brazing powder described above may be mixed and used.

The amount of the brazing powder incorporated into the paste composition is at least 50 mass % and not more than 95 mass %, preferably at least 70 mass % and not more than 93 mass %, more preferably at least 80 mass % and not more than 90 mass %, based on 100 mass % of the paste composition. When the content of the brazing powder is less than 50 mass %, the viscosity of the resulting paste is low to deteriorate coating properties, while the metallic powder in the paste is easily separated and settled during storage. On the other hand, when the content of the brazing powder is higher than 95 mass %, the viscosity of the resulting paste is high to deteriorate coating properties.

The average particle diameter of the brazing powder is at least 1 μm and not more than 175 μm, preferably at least 3 μm and not more than 75 μm, more preferably at least 5 μm and not more than 45 μm. It is not preferable that the average particle diameter of the brazing powder is less than 1 μm, because the content of oxygen in the brazing powder is increased so that brazing insufficiency may be caused particularly when the atmosphere in the brazing process is not reductive. When the average particle diameter of the brazing powder is larger than 175 μm, the viscosity of the resulting paste is low to deteriorate coating properties, while the metallic powder in the paste is easily separated and settled during storage.

The brazing powder is most preferably gas-spray spherical powder with a lower content of oxygen, preferably gas-spray amorphous powder, preferably electrolyzed powder or scale-shaped powder. When a reducing gas such as hydrogen-containing gas, ammonia-containing gas or the like is used as the atmospheric gas in the brazing process, the shape of the brazing powder is not particularly limited. However, when an inert gas such as argon gas, helium gas or the like is used as the atmospheric gas in the brazing process or when brazing is conducted under vacuum, brazing insufficiency may be caused even if the present paste composition containing butyl rubber is used as the binder when the content of oxygen in the brazing powder is high. In this case, gas-spray spherical powder with a lower content of oxygen is used most preferably as a brazing powder, and gas-spray amorphous powder is used preferably.

In the paste composition of the present invention, butyl rubber that is an isobutylene monomer/isoprene monomer copolymer is used as resin acting as a binder. The butyl rubber used is preferably the one having a molecular weight of 250,000 to 500,000. When the molecular weight of butyl rubber is less than 250,000, the viscosity of the resulting paste composition is low to deteriorate coating properties, while the metallic powder in the paste is easily separated and settled during storage. On the other hand, when the molecular weight of butyl rubber is higher than 550,000, the viscosity of the resulting paste composition is high to deteriorate coating properties.

The amount of the butyl rubber to be incorporated into the paste composition should be in the range of at least 0.5 mass % and not more than 10 mass % based on 100 mass % of the paste composition, and is preferably at least 1 mass % and not more than 6 mass %, more preferably at least 2 mass % and not more than 4 mass %. When the content of the butyl rubber is less than 0.5 mass %, the viscosity of the resulting paste composition is low to deteriorate coating properties, thus lowering adhesion to a base material as a subject to be brazed. When the content of the butyl rubber is higher than 10 mass %, the effect of the butyl rubber used as a binder is saturated, resulting in higher costs.

The organic solvent contained in the paste composition of the present invention is not particularly limited insofar as the butyl rubber can be dissolved therein, and for example, one member selected from toluene, hexane and octane or a mixture thereof can be used as the organic solvent.

The amount of the organic solvent to be incorporated into the paste composition is an amount suitable for regulation of the viscosity of the paste composition, and is regulated specifically in the range of at least 3 mass % and not more than 45 mass %, preferably at least 5 mass % and not more than 20 mass %.

Known additives such as an anti-settling agent, a thixotropic agent etc. can be added to the paste composition of the present invention. By this addition, it is possible to improve shelf stability (prevention of separation of the brazing powder), coating properties (prevention of dripping of the applied paste composition) etc.

The paste composition of the present invention can be used by applying it onto a part or the whole of the surface of a base material as a subject to be brazed. Application of the paste composition onto a part of the surface of a base material means that a necessary amount of the paste composition is applied onto a portion to be brazed. The amount of this paste composition to be applied can be determined by calculation from a necessary amount of the brazing material on a portion to be brazed and the content of the brazing material in the paste composition.

The method of applying the paste composition of the present invention may be a known method, and a method of using a dispenser, screening printing, brushing, spraying or the like may be used.

After application, the paste composition of the present invention is dried at room temperature or at a temperature of about 30 to 150° C. if necessary. After application, the paste composition is completely dried before the brazing process. This is because when the paste composition is not dried, the organic solvent in the applied paste composition is rapidly gasified to generate a gas by which the applied paste composition may be scattered. However, when a furnace provided with a preheating chamber is used as the brazing furnace, the organic solvent is removed in the preheating step, and thus it is not always necessary to completely dry the paste composition after application, and the paste composition can be brazed even if it is dry to the touch or not dried. The "dry to the touch" means that the paste composition is dried to such a degree that the composition, upon being pressed against a finger, does not adhere to the finger.

EXAMPLES

Each component was mixed in amounts (mass %) shown in Table 1 (Examples) and Table 2 (Comparative Examples) to prepare paste compositions.

In Tables 1 and 2, "Copper brazing powder" is copper brazing powder (JIS: BCu-1A) manufactured by Nippon Atomize Co., Ltd., which is amorphous powder of 99.6% or more purity passing through screen openings of 75 μm in size. "Nickel brazing powder" is nickel (Ni) brazing powder (JIS: BNi-5) manufactured by Wall Colmony Co., which is spherical powder passing through screen openings of 106 μm in size. "Silver brazing powder" is silver brazing powder (JIS: BAg-7) manufactured by Nippon Atomize Co., Ltd., which is amorphous powder of 99.6% or more purity passing through screen openings of 175 μm in size. "Exon Butyl 268" is a trade name of butyl rubber manufactured by Exon Chemical. "Disparon 305" is a trade name of hydrogenated castor oil (thickener) manufactured by Kusumoto Kasei Co., Ltd. "Ethyl Cellulose N-4" is a trade name of ethyl cellulose resin manufactured by Dow Chemical. "BR-100" is acrylic resin manufactured by Mitsubishi Rayon.

The prepared paste composition was applied linearly to a length of 30 mm by a dispenser (outlet inner diameter, 2 mm) onto one side of a stainless steel plate (2×100×100 mm) i.e. a base material as a subject to be brazed. After application, the paste composition was dried under the drying conditions shown in Tables 1 and 2. In the "Paste drying conditions" in Tables 1 and 2, "a" means that the paste is not dried, "b" means that the paste is dry to the touch, specifically by leaving it at room temperature for 1 hour, "c" means that the paste is completely dried, specifically by heating it at a temperature of 60° C. for 15 minutes in air.

After the paste composition was dried, the stainless steel plate coated with the paste was transferred to, and brazed in, a brazing furnace of the type shown in Tables 1 and 2.

In "Type of brazing furnace" in Tables 1 and 2, "a" means a gas atmosphere furnace containing hydrogen (15%), "b" means a vacuum furnace (degree of vacuum <133×10$^{-3}$ Pa (10$^{-3}$ Torr)), and "c" means an argon gas atmosphere furnace (dew point <−60° C.).

The brazing temperature was 1120° C. where the copper brazing powder was used as metallic powder for brazing, 1150° C. where the nickel brazing powder was used, and 830° C. where the silver brazing powder was used.

After brazing was completed, the molten state of the brazing material and the occurrence of residual carbon on the brazed portion of the stainless steel plate were observed with naked eyes. The observation results are shown in Tables 1 and 2. In "Molten state of brazing material" in Tables 1 and 2, "A" means that the brazing material is excellent in flow, "B" means that the brazing material is slightly poor in flow, "C" means that the brazing material is poor in flow or is not melted. In "residual carbon" in Tables 1 and 2, "A" means no residual carbon, "B" means slight occurrence of residual carbon, and "C" means a large darkened area to deteriorate its commodity value.

The results shown in Table 1 reveal that when the present paste compositions containing butyl rubber as the binder were used, the brazing material was excellent in molten state upon brazing in any type of brazing furnace, and no residual carbon was generated.

On the other hand, the results shown in Table 2 reveal that when the comparative paste compositions containing ethyl cellulose resin or acrylic resin as the binder were brazed in a reducing gas atmosphere furnace i.e. in a hydrogen-containing gas atmosphere furnace, the brazing material was excellent in molten state and no residual carbon was generated, while when they were brazed in a vacuum furnace, the brazing material was excellent in molten state, but slight residual carbon was generated, and when they were brazed in an inert gas atmosphere furnace, the brazing material was slightly poor in flow, and a large amount of residual carbon as a darkened portion was observed.

TABLE 1

| Paste composition | 1 | 2 | 3 | 4 | 5 | 6 | 7 | 8 | 9 | 10 | 11 |
|---|---|---|---|---|---|---|---|---|---|---|---|
| Copper brazing powder | 85 | 85 | 85 | 85 | 85 | | | | | | |
| Nickel brazing powder | | | | | | 85 | 85 | 85 | | | |
| Silver brazing powder | | | | | | | | | 85 | 85 | 85 |
| Exon Butyl 268 | 2.6 | 2.6 | 2.6 | 2.6 | 2.6 | 2.6 | 2.6 | 2.6 | 2.6 | 2.6 | 2.6 |
| Disparon 305 | 0.4 | 0.4 | 0.4 | 0.4 | 0.4 | 0.4 | 0.4 | 0.4 | 0.4 | 0.4 | 0.4 |
| Toluene | 12 | 12 | 12 | 12 | 12 | 12 | 12 | 12 | 12 | 12 | 12 |
| Paste drying conditions | c | c | a | b | c | c | c | c | c | c | c |
| Type of brazing furnace | a | b | c | c | c | a | b | c | a | b | c |
| Molten state of brazing material | A | A | A | A | A | A | A | A | A | A | A |
| Residual carbon | A | A | A | A | A | A | A | A | A | A | A |

TABLE 2

| Paste composition | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Copper brazing powder | 85 | 85 | 85 | | | | | | | 85 | 85 | 85 | | | | | | |
| Nickel brazing powder | | | | 85 | 85 | 85 | | | | | | | 85 | 85 | 85 | | | |
| Silver brazing powder | | | | | | | 85 | 85 | 85 | | | | | | | 85 | 85 | 85 |
| Ethyl Cellulose N-4 | 2.6 | 2.6 | 2.6 | 2.6 | 2.6 | 2.6 | 2.6 | 2.6 | 2.6 | | | | | | | | | |
| BR-100 | | | | | | | | | | 2.6 | 2.6 | 2.6 | 2.6 | 2.6 | 2.6 | 2.6 | 2.6 | 2.6 |

TABLE 2-continued

| Paste composition | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Disparon 305 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Toluene | 12 | 12 | 12 | 12 | 12 | 12 | 12 | 12 | 12 | 12 | 12 | 12 | 12 | 12 | 12 | 12 | 12 | 12 |
| Paste drying conditions | c | c | c | c | c | c | c | c | c | c | c | c | c | c | c | c | c | c |
| Type of brazing furnace | a | b | c | a | b | c | a | b | c | a | b | c | a | b | c | a | b | c |
| Molten state of brazing material | A | A | B | A | A | B | A | A | B | A | A | B | A | A | B | A | A | B |
| Residual carbon | A | B | C | A | B | C | A | B | C | A | B | C | A | B | C | A | B | C |

The ethyl cellulose resin or acrylic resin has a complicated molecular structure, and its linkage is hard to be cleaved even by heating, and the cleaved site is considered to be irregular, and oxygen atoms are contained in its molecular structure. Accordingly, it is considered that in the Comparative Examples, the ethyl cellulose resin or acrylic resin contained as a binder in the paste leaves a carbon component in the brazed portion after brazing, to generate residual carbon.

In the Examples described above, application of the paste composition for brazing of the present invention to a stainless steel plate as a subject to be brazed, but the paste composition of the present invention can be applied not only to stainless steel, but also to various materials such as metallic materials, ceramic materials and graphite. The paste composition containing butyl rubber as the binder has been described in the Examples, but it should be construed that any paste compositions containing a material such as resin bringing about the same function as that of butyl rubber or having equivalent functions to those of butyl rubber also fall under the scope of the present invention.

It is construed that the embodiments and Examples disclosed above are shown for mere illustrative purposes and are not restrictive. It is construed that the scope of the present invention is determined not by the above embodiments or the Examples but by the claims, and encompasses every correction and modification in meaning equivalent to that of the claims and within the scope of the present invention.

INDUSTRIAL APPLICABILITY

The paste composition for brazing of the present invention and the method of using the same are suitable for joining metal, ceramics or graphite.

The invention claimed is:

1. A paste composition usable for joining a metal, ceramics or graphite by brazing in a reducing gas atmosphere furnace, an inert gas atmosphere furnace or a vacuum furnace, comprising a brazing powder, butyl rubber and a liquid organic solvent, said butyl rubber being dissolved in said liquid organic solvent, and said liquid organic solvent being completely removable from said composition upon heating,
wherein the brazing powder includes at least one member selected from the group consisting of copper brazing powder, brass brazing powder, silver brazing powder, phosphorus copper brazing powder, nickel brazing powder, gold brazing powder, palladium brazing powder, copper-manganese brazing powder, silver-manganese brazing powder and cobalt brazing powder, and the paste composition comprises the brazing powder in an amount of at least 80 mass % and not more than 95 mass % and the butyl rubber in an amount of at least 0.5 mass % and not more than 10 mass %, respectively, based on 100 mass % of the paste composition.

2. The paste composition for brazing according to claim 1, wherein the average particle diameter of the brazing powder is at least 1 μm and not more than 175 μm.

3. The paste composition for brazing according to claim 1, wherein said butyl rubber has a molecular weight of from 250,000 to 500,000.

4. A brazing method for joining a base material comprising a metal, ceramics or graphite comprising the steps of applying a paste composition for brazing onto at least a part of a surface of said base material and then brazing the said base material onto another said base material in a reducing gas atmosphere furnace, an inert gas atmosphere furnace or a vacuum furnace,
wherein the paste composition for brazing comprises a brazing powder, butyl rubber and a liquid organic solvent said butyl rubber being dissolved in said liquid organic solvent, said liquid organic solvent being completely removable from said composition upon heating, and
the brazing powder includes at least one member selected from the group consisting of copper brazing powder, brass brazing powder, silver brazing powder, phosphorus/copper brazing powder, nickel brazing powder, gold brazing powder, palladium brazing powder, copper-manganese brazing powder, silver-manganese brazing powder and cobalt brazing powder, and the paste composition comprises the brazing powder in an amount of at least 80 mass % and not more than 95 mass % and the butyl rubber in an amount of at least 0.5 mass % and not more than 10 mass %, respectively, based on 100 mass % of the paste composition.

5. The brazing method according to claim 4, wherein the step of brazing is carried out in a vacuum furnace.

6. The brazing method according to claim 4, wherein the step of brazing is carried out in a gas atmosphere furnace.

7. The brazing method according to claim 6, wherein an argon gas and/or a helium gas is used as the atmospheric gas.

8. The brazing method according to claim 6, wherein a hydrogen-containing gas and/or an ammonia-containing gas is used as the atmospheric gas.

9. The brazing method according to claim 4, wherein said butyl rubber has a molecular weight of from 250,000 to 500,000.

* * * * *